(12) United States Patent
Gitelman et al.

(10) Patent No.: US 11,956,252 B2
(45) Date of Patent: Apr. 9, 2024

(54) TECHNIQUES FOR RESOLVING CONTRADICTORY DEVICE PROFILING DATA

(71) Applicant: Armis Security Ltd., Tel Aviv-Jaffa (IL)

(72) Inventors: Shaked Gitelman, Tel Aviv (IL); Adi Krespil-Lo, Tel Aviv (IL)

(73) Assignee: ARMIS SECURITY LTD., Tel Aviv-Jaffa (IL)

( * ) Notice: Subject to any disclaimer, the term of this patent is extended or adjusted under 35 U.S.C. 154(b) by 60 days.

(21) Appl. No.: 16/715,464

(22) Filed: Dec. 16, 2019

(65) Prior Publication Data

US 2021/0185058 A1   Jun. 17, 2021

(51) Int. Cl.
*H04L 29/06* (2006.01)
*H04L 9/40* (2022.01)
*H04L 67/303* (2022.01)

(52) U.S. Cl.
CPC ........ *H04L 63/1416* (2013.01); *H04L 63/102* (2013.01); *H04L 67/303* (2013.01)

(58) Field of Classification Search
CPC .............. H04L 41/082; H04L 41/0813; H04L 41/0816; H04L 43/10; H04L 67/42; H04L 63/102; H04L 67/16; H04L 67/303; H04L 67/306; H04W 48/16; G06F 16/9038; G06F 21/57; G06F 40/205; G06F 3/048; G06N 5/003; G06Q 30/0251; H04N 21/4826
See application file for complete search history.

(56) References Cited

U.S. PATENT DOCUMENTS

| | | | |
|---|---|---|---|
| 10,063,434 B1 | 8/2018 | Khanal et al. | |
| 10,091,312 B1 * | 10/2018 | Khanwalkar | H04L 67/306 |
| 10,104,101 B1 | 10/2018 | Thakar et al. | |
| 10,380,348 B2 | 8/2019 | Cheng et al. | |

(Continued)

FOREIGN PATENT DOCUMENTS

| | | | | |
|---|---|---|---|---|
| EP | 3442164 A1 | 2/2019 | | |
| WO | WO-2013075890 A1 * | 5/2013 | ......... | G06Q 30/0251 |

OTHER PUBLICATIONS

International Search Report and Written Opinion of International Searching Authority for PCT/IB2020/061713, ISA/IL, Jerusalem, Israel, dated Dec. 28, 2020.

*Primary Examiner* — Dustin Nguyen
(74) *Attorney, Agent, or Firm* — Perkins Coie LLP (57) ABSTRACT

A system and method for resolving contradictory device profiling data. The method includes: determining a set of non-contradicting values and a set of contradicting values in device profiling data related to a device based on a plurality of conflict rules; merging values of the set of non-contradicting values in device profiling data into at least one first value; selecting at least one second value from the set of contradicting values, wherein selecting one of the at least one second value from each set of contradicting values further includes generating a certainty score corresponding to each value of the set of contradicting values, wherein each certainty score indicates a likelihood that the corresponding value is accurate, wherein the at least one second value is selected based on the certainty scores; and creating a device profile based on the at least one first value and the at least one second value.

20 Claims, 4 Drawing Sheets

(56) References Cited

U.S. PATENT DOCUMENTS

| | | | |
|---|---|---|---|
| 2008/0126286 A1* | 5/2008 | Machani | G06F 21/57 |
| | | | 706/47 |
| 2013/0239177 A1 | 9/2013 | Sigurdson et al. | |
| 2016/0127777 A1* | 5/2016 | Roberts | H04N 21/4826 |
| | | | 725/14 |
| 2016/0366040 A1* | 12/2016 | Nampelly | H04L 67/42 |
| 2017/0250979 A1* | 8/2017 | Benson | H04L 63/102 |
| 2017/0332238 A1* | 11/2017 | Bansal | H04L 67/16 |
| 2019/0014137 A1 | 1/2019 | Du et al. | |
| 2019/0034413 A1* | 1/2019 | Rosewell | G06F 40/205 |
| 2019/0132205 A1 | 5/2019 | Du et al. | |
| 2019/0215380 A1* | 7/2019 | Rykowski | G06F 3/048 |
| 2019/0306731 A1* | 10/2019 | Raghuramu | H04L 67/303 |
| 2020/0145287 A1* | 5/2020 | Savalle | H04L 41/0813 |
| 2020/0151616 A1* | 5/2020 | Mermoud | G06N 5/003 |
| 2020/0382373 A1* | 12/2020 | Mermoud | H04L 41/0816 |
| 2020/0382527 A1* | 12/2020 | Mitelman | G06F 16/9038 |
| 2020/0396129 A1* | 12/2020 | Tedaldi | H04L 43/10 |
| 2020/0403854 A1* | 12/2020 | Arunachalam | H04L 41/082 |

\* cited by examiner

TECHNIQUES FOR RESOLVING CONTRADICTORY DEVICE PROFILING DATA

TECHNICAL FIELD

The present disclosure relates generally to device profiling, and more specifically to automatically resolving contradicting data used to construct a device profile from multiple data sources.

BACKGROUND

Cybersecurity is the protection of information systems from theft or damage to the hardware, to the software, and to the information stored in them, as well as from disruption or misdirection of the services such systems provide. Cybersecurity is now a major concern for virtually any organization, from business enterprises to government institutions. Hackers and other attackers attempt to exploit any vulnerability in the infrastructure, hardware, or software of the organization to execute a cyber-attack. There are additional cybersecurity challenges due to high demand for employees or other users of network systems to bring their own devices, the dangers of which may not be easily recognizable.

To protect networked systems against malicious entities accessing the network, some existing solutions attempt to profile devices accessing the network. Such profiling may be helpful for detecting anomalous activity and for determining which cybersecurity mitigation actions are needed for activity of a given device. Providing accurate profiling is a critical challenge to ensuring that appropriate mitigation actions are taken.

The challenge involved with profiling a user device is magnified by the fact there is no industry standard for querying and/or obtaining information from user devices, user devices, and so on.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for resolving contradictory device profiling data. The method comprises: determining at least one set of non-contradicting values and at least one set of contradicting values in device profiling data related to a device based on a plurality of conflict rules, wherein each set of non-contradicting values and each set of contradicting values is a plurality of values of the device profiling data; merging values of each of the at least one set of non-contradicting values in device profiling data into at least one first value; selecting at least one second value from the at least one set of contradicting values, wherein selecting one of the at least one second value from each set of contradicting values further comprises generating a plurality of certainty scores, wherein each certainty score corresponds to a value of the at least one set of contradicting values, wherein each certainty score indicates a likelihood that the corresponding value is accurate, wherein the at least one second value is selected based on the plurality of certainty scores; and creating a device profile for the device based on the at least one first value and the at least one second value.

Certain embodiments disclosed herein also include a non-transitory computer readable medium having stored thereon causing a processing circuitry to execute a process, the process comprising: determining at least one set of non-contradicting values and at least one set of contradicting values in device profiling data related to a device based on a plurality of conflict rules, wherein each set of non-contradicting values and each set of contradicting values is a plurality of values of the device profiling data; merging values of each of the at least one set of non-contradicting values in device profiling data into at least one first value; selecting at least one second value from the at least one set of contradicting values, wherein selecting one of the at least one second value from each set of contradicting values further comprises generating a plurality of certainty scores, wherein each certainty score corresponds to a value of the at least one set of contradicting values, wherein each certainty score indicates a likelihood that the corresponding value is accurate, wherein the at least one second value is selected based on the plurality of certainty scores; and creating a device profile for the device based on the at least one first value and the at least one second value.

Certain embodiments disclosed herein also include a system for resolving contradictory device profiling data. The system comprises: a processing circuitry; and a memory, the memory containing instructions that, when executed by the processing circuitry, configure the system to: determine at least one set of non-contradicting values and at least one set of contradicting values in device profiling data related to a device based on a plurality of conflict rules, wherein each set of non-contradicting values and each set of contradicting values is a plurality of values of the device profiling data; merge values of each of the at least one set of non-contradicting values in device profiling data into at least one first value; select at least one second value from the at least one set of contradicting values, wherein selecting one of the at least one second value from each set of contradicting values further comprises generating a plurality of certainty scores, wherein each certainty score corresponds to a value of the at least one set of contradicting values, wherein each certainty score indicates a likelihood that the corresponding value is accurate, wherein the at least one second value is selected based on the plurality of certainty scores; and create a device profile for the device based on the at least one first value and the at least one second value.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that data related to and obtained from user devices may be contradictory. Such data may also appear contradictory even if it is not due to, for example, differences in formatting. In particular, when tapping into traffic or otherwise obtaining data originating from multiple data sources, data from the different sources may be formatted differently or may be substantively contradictory. Thus, it would be desirable to both merge non-contradictory data and resolve contradictions between portions of contradictory data.

Additionally, data obtained from sources may be deceitful, either intentionally or by accident. For example, an application running on the iOS® operating system may send a message indicating that it is running on the Android™ operating system because the developers of the iOS application copied portions of the code from a counterpart Android application. This identification of operating system is therefore misleading and could result in an inaccurate device profile.

It has been identified that manual resolution of contradictions is impractical at best. As a practical matter, hundreds or thousands of devices may engage in communications over a given network daily, particularly in larger organizations. Profiling each of these devices, in real-time, cannot be practically performed by even a large team of individuals.

Manual device profiling by a human would also introduce issues of subjectivity that may lead to inconsistent device profiling. Specifically, manual device profiling would require making subjective decisions regarding which portions of data to use. These subjective decisions would produce different device profiles by different decisionmakers.

To address these contradictory data used for device profiling, the disclosed embodiments provide techniques for resolving contradictions and, in particular, contradictory data from different data sources. Data from multiple data sources is parsed in order to separately extract profile-relevant data from each data source. The extracted data from the multiple data sources is aggregated as described herein to create a device profile.

In an embodiment, values extracted from different data sources are determined to be alternatives to each other. Non-contradictory values are merged into a single value. In a further embodiment, the merged value is the most specific value among the non-contradicting alternatives. Selections are made from among any remaining contradictory values using at least certainty scores indicating the likelihood that their respective values are accurate. The selected and non-conflicting values are used to create a device profile.

Mitigation actions may further be performed based on anomalous activity detected using the device profile. To this end, traffic may be monitored to detect deviations from the device profile or from a behavioral profile associated with the device profile. The mitigation actions may include, but are not limited to, limiting network access, terminating access by one or more user devices, limiting access to sensitive systems available over the network, and the like.

Figure 1:
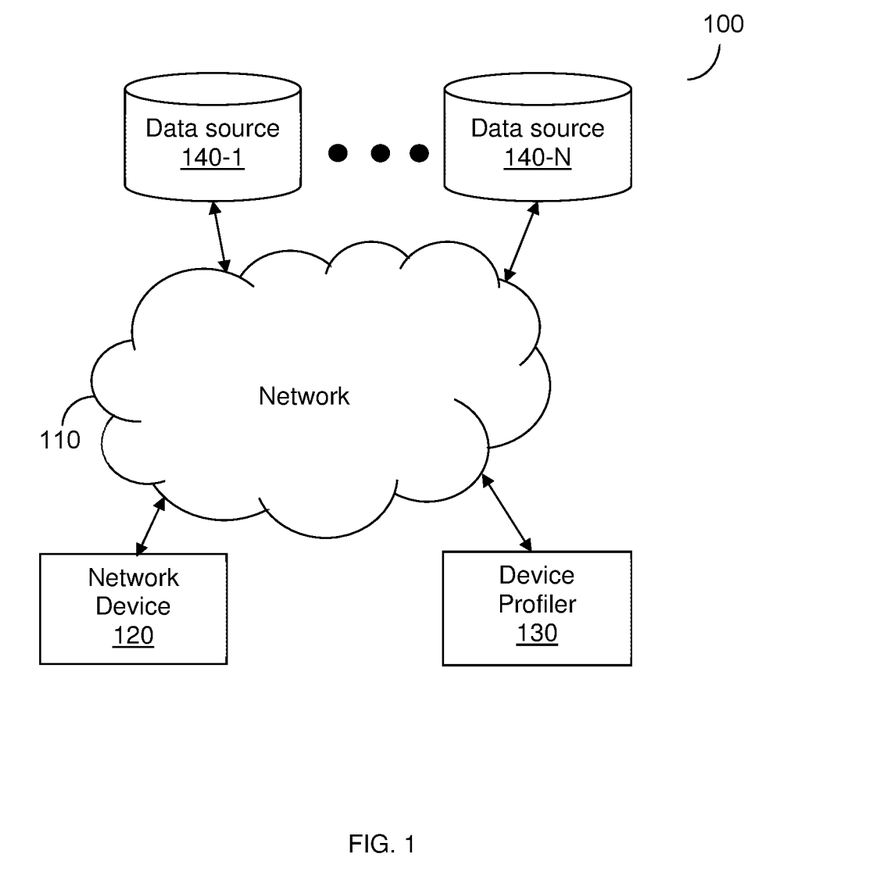
FIG. 1 is a network diagram utilized to describe various disclosed embodiments.

FIG. 1 shows an example network diagram 100 utilized to describe the various disclosed embodiments. In the example network diagram 100, a user device 120, a device profiler 130, and a plurality of data sources 140-1 through 140-N (hereinafter referred to individually as a data source 140 and collectively as data sources 140, merely for simplicity purposes) are communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device 120 may be, but is not limited to, a personal computer, a laptop, a tablet computer, a smartphone, a wearable computing device, or any other device capable of accessing services over a network such as the network 110.

The data sources 140 provide or store device profiling data that is relevant to identifying a type or profile of the user device 120. Such device profiling data may include, but is not limited to, discovery data (e.g., dynamic host configuration protocol, multicast domain name system, service set identifier, network basic input/output system, etc.), behavioral data (time and types of activities, domains accessed, protocols used, etc.), self-announcement data from the user device 120 (e.g., a user agent sent by the user device 120), network-related traffic from the network device 120 (e.g., transistor-transistor logic, dynamic host configuration signatures, etc.), or a combination thereof. In some implementations, at least some of the device profiling data may be obtained directly from the user device 120.

The device profiler 130 is configured to resolve contradictions among data through aggregation of data received from the user device 120, the data sources 140, or both, and to create a device profile based on the aggregation of the contradictory data. The device profiler 130 certainty scores based on portions of the data. The certainty score indicates a likelihood that the portion of data is accurate based on predetermined certainty rules.

The device profiler 130 may be configured to detect anomalies based on the device profile, one or more cybersecurity rules for a device matching the device profile, or a combination thereof. The device profiler 130 may further be configured to perform mitigation actions in response to detecting anomalous activity.

The device profiler 130 may be deployed, for example, in the cloud (i.e., via a cloud computing infrastructure) or on-premises, for example, on a local network within an organization. The device profiler 130 may be realized as a system such as a server. A non-limiting example schematic diagram for the device profiler 130 is described with respect to FIG. 4.

Figure 2:
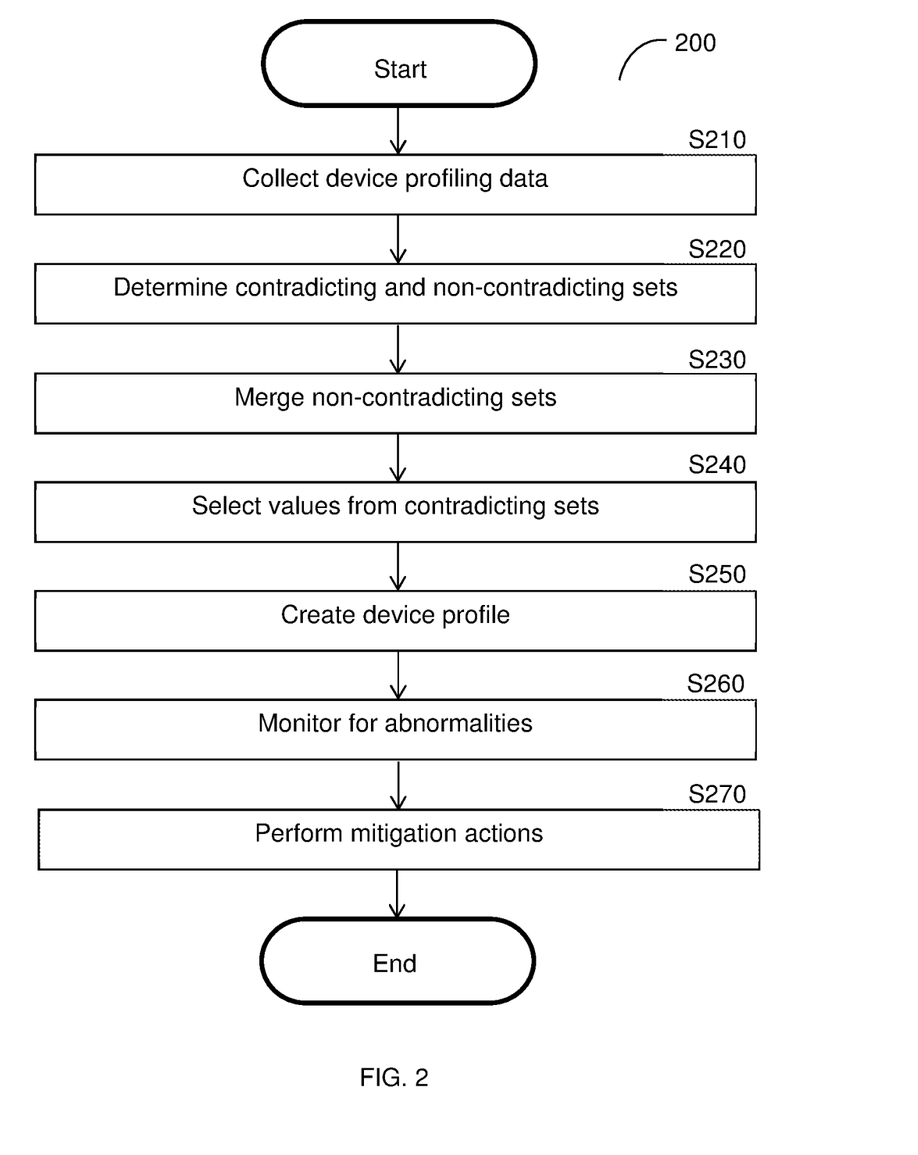
FIG. 2 is an example flowchart illustrating a method for resolving contradictions in device profiling data according to an embodiment.

FIG. 2 is an example flowchart 200 illustrating a method for resolving contradictions in device profiling data according to an embodiment. In an embodiment, the method is performed by the device profiler 130, FIG. 1.

At S210, device profiling data for a device (e.g., the user device 120, FIG. 1) is collected. In an embodiment, the collected device profiling data includes data from multiple data sources. In an example implementation, the device profiling data is collected from traffic coming in to and going out of the device. In an example implementation, the traffic may be intercepted as described further in U.S. patent application Ser. No. 15/398,118, now U.S. Pat. No. 10,511,620, assigned to the common assignee, the contents of which are hereby incorporated by reference.

The device profiling data includes various values indicating characteristics about the device, of activity conducted by the device, and the like. Such values may include, but are not limited to, network discovery data (e.g., dynamic host configuration protocol, multicast domain name system, service set identifier, network basic input/output system, etc.), behavioral data (e.g., time and types of activities, domains accessed, protocols used, etc.), self-announcement data (e.g., a user agent sent by the device), network-related traffic (e.g., transistor-transistor logic, dynamic host configuration signatures, etc.), type of device (e.g., smartphone, tablet computer, laptop computer, vehicle, server, etc.), manufacturer (e.g., as identified by an organizationally unique identifier), brand, model, applications installed on the device, operating system of the device, times of one or more most recent software change (e.g., software update, change of operating system, installation of applications, times for each, and the like), source of data (e.g., the device itself, a network device, a cybersecurity threat detector, etc.), combinations thereof, and the like. The source of data may further more specifically identify, for example, particular software the device profiling data is received from such as, but not limited to, a particular application executed on the device.

At S220, one or more non-contradicting sets of values and one or more contradicting sets of values are determined from among the device profiling data. Whether values are contradicting or not may be determined based on contradiction rules. The contradiction rules define which values are correlated to each other and whether the correlated values contradict each other. For example, values that are related to the same field of a device profile are correlated.

The contradiction rules may be based on a predetermined set of known contradicting values, non-contradicting values, or a combination thereof. As non-limiting examples, known contradicting values may include "iOS®" and "Android™" for an operating system field while known non-contradicting values may include "Linux" and "Android" for an operating system field. In other words, data indicating different operating systems may be determined as contradictory while data that indicates an operating system and a family of operating systems are determined as non-contradictory.

At S230, values of each non-contradicting set are merged into a merged value. In an embodiment, a most specific value among each non-contradicting set is used as the merged value. As a non-limiting example, when "Linux®" and "Android™" are among a set of non-contradicting values, "Android" may be used as the merged value since it describes the more specific operating system rather than a family of operating systems.

At S240, a value is selected from among each set of contradicting values. In an embodiment, each value is selected using data from a knowledge base, using machine learning to match values with values of known profiles, based on values of previous device profiling data, or a combination thereof. The value may be selected by matching the contradicting values to known profiles or based on historical values. Thus, in some embodiments, values are selected based on a matched known profile, while in others a new profile may be identified.

In an embodiment, the value is selected from among each set of contradicting values based on one or more of the following: certainty scores, matching to known profiles, probabilities of matching combinations of values, machine learning based on known device profiles or known behaviors for devices, tenant-specific machine learning based on known device profiles for a particular entity, or a combination thereof.

Matching to known valid profiles may include, but is not limited to, comparing combinations of potential values from among the device profiling data to known device profiles. Values may be compared per field such that like fields between compared profiles are compared. The combinations of potential values include any merged values as well as one value from each set of contradicting values. In some implementations, a matching score may be determined based on, for example, a ratio of matching values to non-matching values. As a non-limiting example, if device profiling data indicates that the device uses "Android™" operating system for a car's internal system and a known valid device profile indicates that "Android™" operating system has been applied to cars, the device profiles may match.

Matching value probabilities may include, but is not limited to, determining a probability that two values coexist. Thus, in an embodiment, S240 may include determining such a probability for each value of the set of contradicting values based on historical profiles and one or more other values. As a non-limiting example, manufacturer "SAMSUNG™" may coexist with "Android™" operating system in the vast majority of historical device profiles including manufacturer "SAMSUNG" while manufacturer "SAMSUNG" may not coexist with "iOS®" operating system in any historical device profiles including "manufacturer "SAMSUNG™" such that the manufacturer "SAMSUNG™" with "Android™" combination has a high probability while the manufacturer "SAMSUNG™" with "iOS®" combination has a low probability. By matching value probabilities generally instead of with respect to specific profiles, some embodiments may allow for identifying new profiles rather than existing known profiles.

In some embodiments, a machine learning model is trained to match a profile including each value of the set of contradicting values with historical data. More specifically, the machine learning model may be trained to cluster the device profiling data into one or more known profiles. In another embodiment, machine learning may be utilized to match the value to one or more behaviors associated with known device profiles. In some implementations, the machine learning model may be tenant-specific, i.e., the model is trained based on device profiling data from a particular entity (the tenant) such that the model reflects idiosyncrasies in devices accessing the entity's network.

In an embodiment, S240 includes generating a certainty score for each value of each set of contradicting values and comparing the generated certainty scores of each set of contradicting values. In a further embodiment, the value with the highest certainty score among each set of conflicting values is selected to be used to create the device profile. Generating certainty scores is described further with respect to FIG. 3.

Figure 3:
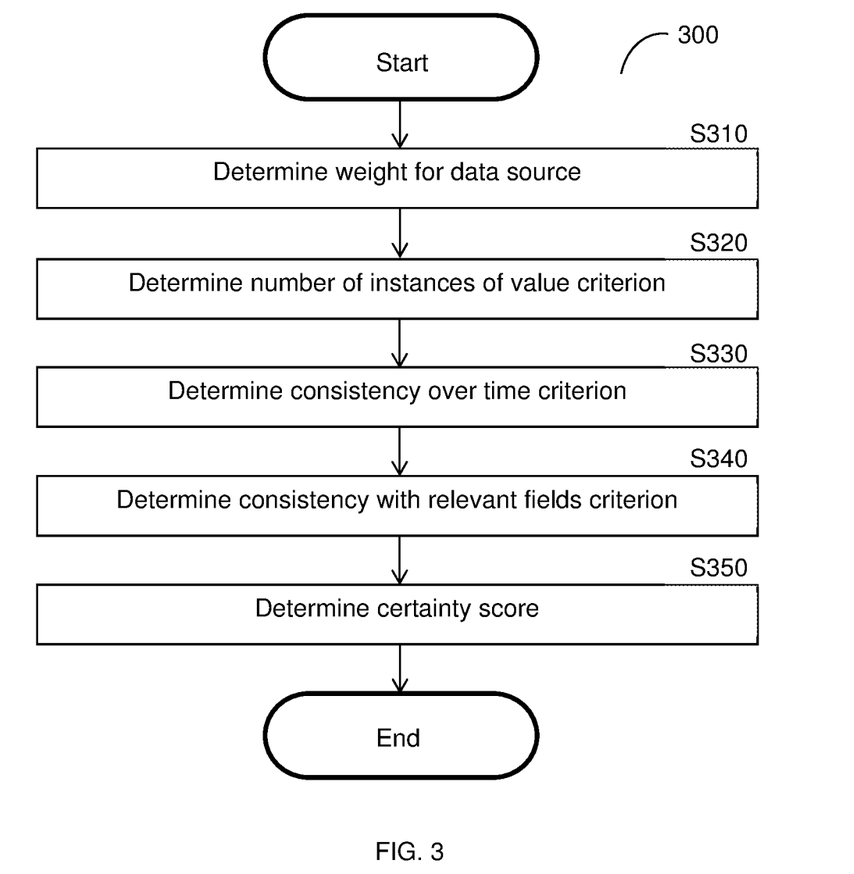
FIG. 3 is an example flowchart illustrating a method for generating a certainty score according to an embodiment.

FIG. 3 is an example flowchart 300 illustrating a method for generating a certainty score for a value in device profiling data according to an embodiment.

At S310, a weight is determined for a data source from which the value was derived.

The weight may be determined using a predetermined knowledge base, using a machine learning model trained to learn reliability of data from particular data sources, and the like. As a non-limiting example for a weight from a predetermined knowledge base, an identifier of any User Agent may be assigned a lower weight than a known reliable organizationally unique identifier. As another non-limiting example, an identifier of a known unreliable application may be assigned a lower weight than an identifier of a known reliable application.

At S320, a number of instances for the value within the device profiling data criterion is determined. In an embodiment, S320 includes further determining a relative amount or frequency of instances of the value. As a non-limiting example, when 99 out of 100 devices are indicated in the device profiling data as being "iPhone®" smartphone brand, then an indicator that a device is "Samsung Galaxy®" smartphone brand will result in a low number of instances criterion.

At S330, a consistency (or lack thereof) criterion of the device profile is determined with respect to the value. The consistency criterion may be based on a number of times this value has changed for the device, an amount of time since the last change, or a combination thereof. As a non-limiting example, if a device has changed from using operating system "Android™" to using operating system "iOS®" but there are no other changes in operating system and the device changed to using ""iOS®" over a threshold period of time, the resulting consistency criterion will be high.

At S340, a consistency criterion indicating a degree to which the value conflicts with other values of one or more relevant fields are determined. The relevant fields may be predetermined relevant fields based on known trends (e.g., as defined in a predetermined knowledge base). As a non-limiting example, if the device profiling data indicates that a device is "Samsung Galaxy®" smartphone brand but a relevant "applications installed" field indicates that the device has an application lacking a version used by "Samsung Galaxy®" brand smartphones installed, then the consistency criterion will be low.

At S350, a certainty score is generated based on the determined criteria. Generating the certainty score may include, but is not limited to, applying the determined weight to one or more of the criteria determined in S320 through S340. In some implementations, the criteria may be aggregated and the weight may be applied thereto.

It should be noted that, in at least some embodiments, the criteria used to generate the certainty score may include only a portion of the criteria described with respect to FIG. 3. To this end, in some embodiments, any of steps S320 through S340 may not be performed.

Returning to FIG. 2, at S250, a device profile is created based on the merged and selected values.

At optional S260, activity of the device is monitored in order to detect abnormalities with respect to the device profile. The abnormalities may include activity that deviates from the device profile or from a behavioral profile associated with the device profile.

At optional S270, one or more mitigation actions are performed based on the detected abnormalities. The mitigation actions may include, but are not limited to, restricting access by the device, terminating access by one or more user devices, limiting access to sensitive systems available over the network, and the like.

Figure 4:
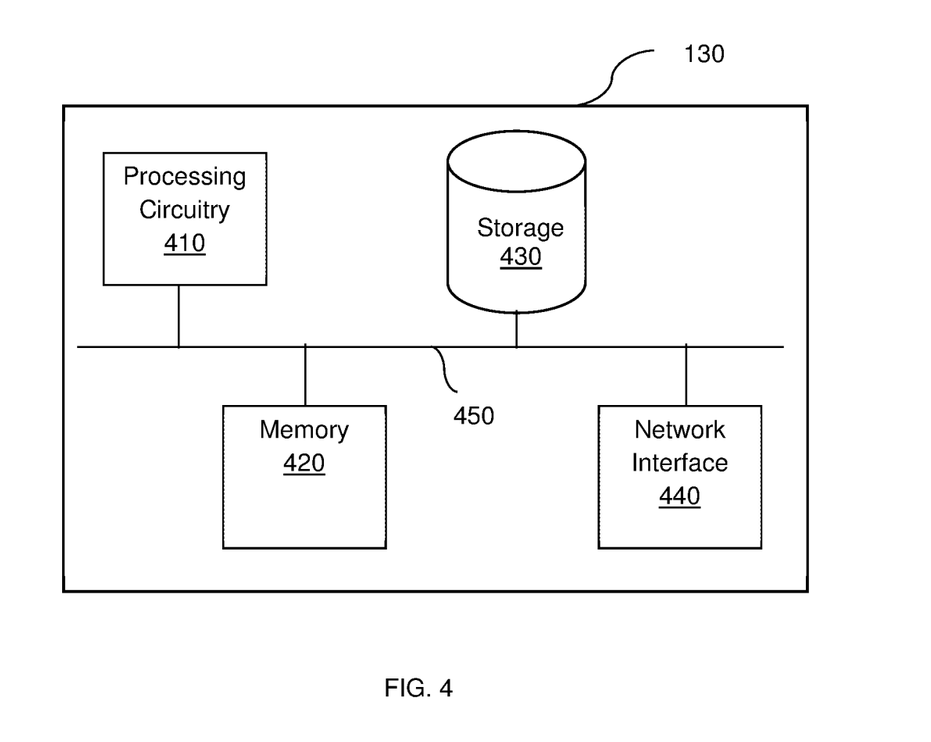
FIG. 4 is a schematic diagram of a contradiction resolver according to an embodiment.

FIG. 4 is an example schematic diagram of a device profiler 130 according to an embodiment. The device profiler 130 includes a processing circuitry 410 coupled to a memory 420, a storage 430, and a network interface 440. In an embodiment, the components of the device profiler 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the device profiler 130 to communicate with the user device 120, the data sources 140, or both for the purpose of, for example, receiving or retrieving data.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for resolving contradictory device profiling data, comprising:
   determining at least one set of non-contradicting values and at least one set of contradicting values in device profiling data related to a device based on a plurality of conflict rules, wherein each set of non-contradicting values and each set of contradicting values is a plurality of values of the device profiling data;
   merging values of each of the at least one set of non-contradicting values in device profiling data into at least one first value;
   selecting at least one second value from the at least one set of contradicting values, wherein selecting one of the at least one second value from each set of contradicting values further comprises generating a plurality of certainty scores, wherein each certainty score corresponds to a value of the at least one set of contradicting values, wherein each certainty score indicates a likelihood that the corresponding value is accurate, wherein the at least one second value is selected based on the plurality of certainty scores, wherein the at least one second value is selected based further on at least one known device profile, wherein selecting the at least one second value further comprises comparing at least one combination of values of the device profiling data to each of the at least one known device profile, the at least one combination of values comprising the at least one first value and at least one contradicting value of the at least one set of contradicting values; and
   creating a device profile for the device based on the at least one first value and the at least one second value.

2. The method of claim 1, wherein each of the at least one first value is a most specific value among one of the at least one set of non-contradicting values.

3. The method of claim 1, wherein each certainty score is determined based on a data source of the corresponding value.

4. The method of claim 1, wherein each certainty score is determined based on at least one of: an amount of instances of the corresponding value in the device profiling data, and a frequency of instances of the corresponding value in the device profiling data.

5. The method of claim 1, wherein each certainty score is determined based on a respective value of a previously created device profile.

6. The method of claim 1, wherein each certainty score is determined based further on at least one indirectly conflicting value in the device profiling data.

7. The method of claim 1, further comprising: determining at least one mitigation action based on the created device profile and activity of the device; and performing the at least one mitigation action.

8. The method of claim 7, wherein the at least one mitigation action includes restricting access of the device.

9. A non-transitory computer readable medium having stored thereon instructions for causing a processing circuitry to execute a process, the process comprising:
   determining at least one set of non-contradicting values and at least one set of contradicting values in device profiling data related to a device based on a plurality of conflict rules, wherein each set of non-contradicting values and each set of contradicting values is a plurality of values of the device profiling data;
   merging values of each of the at least one set of non-contradicting values in device profiling data into at least one first value;
   selecting at least one second value from the at least one set of contradicting values, wherein selecting one of the at least one second value from each set of contradicting values further comprises generating a plurality of certainty scores, wherein each certainty score corresponds to a value of the at least one set of contradicting values, wherein each certainty score indicates a likelihood that the corresponding value is accurate, wherein the at least one second value is selected based on the plurality of certainty scores, wherein the at least one second value is selected based further on at least one known device profile, wherein selecting the at least one second value further comprises comparing at least one combination of values of the device profiling data to each of the at least one known device profile, the at least one combination of values comprising the at least one first value and at least one contradicting value of the at least one set of contradicting values; and
   creating a device profile for the device based on the at least one first value and the at least one second value.

10. A system for resolving contradictory device profiling, comprising:
    a processing circuitry; and
    a memory, the memory containing instructions that, when executed by the processing circuitry, configure the system to:
       determine at least one set of non-contradicting values and at least one set of contradicting values in device profiling data related to a device based on a plurality of conflict rules, wherein each set of non-contradicting values and each set of contradicting values is a plurality of values of the device profiling data;

merge values of each of the at least one set of non-contradicting values in device profiling data into at least one first value;

select at least one second value from the at least one set of contradicting values, wherein selecting one of the at least one second value from each set of contradicting values further comprises generating a plurality of certainty scores, wherein each certainty score corresponds to a value of the at least one set of contradicting values, wherein each certainty score indicates a likelihood that the corresponding value is accurate, wherein the at least one second value is selected based on the plurality of certainty scores, wherein the at least one second value is selected based further on at least one known device profile, wherein selecting the at least one second value further comprises comparing at least one combination of values of the device profiling data to each of the at least one known device profile, the at least one combination of values comprising the at least one first value and at least one contradicting value of the at least one set of contradicting values; and create a device profile for the device based on the at least one first value and the at least one second value.

11. The system of claim 10, wherein each of the at least one first value is a most specific value among one of the at least one set of non-contradicting values.

12. The system of claim 10, wherein each certainty score is determined based on a data source of the corresponding value.

13. The system of claim 10, wherein each certainty score is determined based on at least one of: an amount of instances of the corresponding value in the device profiling data, and a frequency of instances of the corresponding value in the device profiling data.

14. The system of claim 10, wherein each certainty score is determined based on a respective value of a previously created device profile.

15. The system of claim 10, wherein each certainty score is determined based further on at least one indirectly conflicting value in the device profiling data.

16. The system of claim 10, wherein the system is further configured to: determine at least one mitigation action based on the created device profile and activity of the device; and perform the at least one mitigation action.

17. The system of claim 16, wherein the at least one mitigation action includes restricting access of the device.

18. The method of claim 1, wherein the at least one combination of values comprises a first combination of values and a second combination of values, wherein the first combination of values comprises the at least one first value and a first contradicting value of the at least one set of contradicting values, and wherein the second combination of values comprises the at least one first value and a second contradicting value of the at least one set of contradicting values.

19. The non-transitory computer readable medium of claim 9, wherein the at least one combination of values comprises a first combination of values and a second combination of values, wherein the first combination of values comprises the at least one first value and a first contradicting value of the at least one set of contradicting values, and wherein the second combination of values comprises the at least one first value and a second contradicting value of the at least one set of contradicting values.

20. The system of claim 10, wherein the at least one combination of values comprises a first combination of values and a second combination of values, wherein the first combination of values comprises the at least one first value and a first contradicting value of the at least one set of contradicting values, and wherein the second combination of values comprises the at least one first value and a second contradicting value of the at least one set of contradicting values.

* * * * *